(12) United States Patent
Bejerano et al.

(10) Patent No.: US 9,253,101 B2
(45) Date of Patent: Feb. 2, 2016

(54) METHOD AND APPARATUS OF GROUP CREDIT CONTROL FOR WIRELESS NETWORKS

(71) Applicant: Alcatel-Lucent USA Inc., Murray Hill, NJ (US)

(72) Inventors: Yigal Bejerano, Springfield, NJ (US); Pramod Koppol, Manalapan, NJ (US); John Reid, Naperville, IL (US); Daniel Andrews, Chatham, NJ (US); Aleksandr Stolyar, Basking Ridge, NJ (US); Sreedhar Rao, Lewis Center, OH (US)

(73) Assignee: Alcatel Lucent, Boulogne-Billancourt (FR)

( * ) Notice: Subject to any disclaimer, the term of this patent is extended or adjusted under 35 U.S.C. 154(b) by 374 days.

(21) Appl. No.: 13/653,737

(22) Filed: Oct. 17, 2012

(65) Prior Publication Data

US 2014/0105018 A1  Apr. 17, 2014

(51) Int. Cl.
*H04L 12/851* (2013.01)
*H04L 12/24* (2006.01)
(Continued)

(52) U.S. Cl.
CPC ........ *H04L 47/2425* (2013.01); *H04L 12/1403* (2013.01); *H04L 12/1467* (2013.01); *H04L 41/044* (2013.01); *H04L 41/0893* (2013.01);
(Continued)

(58) Field of Classification Search
CPC ............ H04L 12/1403; H04L 12/1435; H04L 12/1467; H04L 41/044; H04L 41/0893; H04L 41/5006; H04L 47/2425; H04N 2201/3215; H04W 4/26
USPC .................................. 370/235; 713/153, 185
See application file for complete search history.

(56) References Cited

U.S. PATENT DOCUMENTS 6,144,639 A * 11/2000 Zhao et al. ..................... 370/235
8,320,246 B2 * 11/2012 Foottit ................ H04L 12/5695
370/230

(Continued)

FOREIGN PATENT DOCUMENTS

WO    WO98/15133    4/1998

OTHER PUBLICATIONS

A. Lior, "Prepaid Extensions to Remote Authentication Dial-In User Service (RADIUS)," draft-lior-radius-prepaid-extensions-14.txt, No. 14, Jul. 14, 2008, XP015056678.

(Continued)

*Primary Examiner* — Un C Cho
*Assistant Examiner* — Shah Rahman
(74) *Attorney, Agent, or Firm* — Harness, Dickey & Pierce, P.L.C.

(57) ABSTRACT

Methods are provided for metering the usage, on a group of lines subject to a group user agreement, of the data processing capacity of a network. Implementations include steps of receiving usage reports from respective lines of the group at least when usage quotas granted to the lines are exhausted; maintaining a total, over the group, of usage that has been reported by the lines and of outstanding usage quotas that have been granted to the lines; and maintaining a comparison between the total outstanding group quota and a limit that depends on the total reported group usage, so as to detect violation events when said quota violates the limit. Upon occurrence of violation events, instructions for the processors serving respective lines to reallocate quota are sent selectively.

13 Claims, 7 Drawing Sheets

(51) Int. Cl.
*H04L 12/14* (2006.01)
*H04W 4/26* (2009.01)
*H04M 15/00* (2006.01)
*H04W 4/24* (2009.01)

(52) U.S. Cl.
CPC ......... *H04L 41/5006* (2013.01); *H04M 15/765* (2013.01); *H04M 15/83* (2013.01); *H04M 15/852* (2013.01); *H04W 4/24* (2013.01); *H04W 4/26* (2013.01); *H04L 12/1435* (2013.01)

(56) References Cited

U.S. PATENT DOCUMENTS

| | | | |
|---|---|---|---|
| 2004/0131013 A1* | 7/2004 | Ise et al. | 370/229 |
| 2004/0193513 A1* | 9/2004 | Pruss et al. | 705/30 |
| 2005/0226153 A1* | 10/2005 | Scifres et al. | 370/232 |
| 2006/0034330 A1* | 2/2006 | Iwamura | 370/468 |
| 2011/0093596 A1* | 4/2011 | Zimmet | G06F 9/5061 709/226 |
| 2011/0275344 A1* | 11/2011 | Momtahan | H04L 12/14 455/405 |
| 2011/0276442 A1* | 11/2011 | Momtahan et al. | 705/30 |
| 2011/0299395 A1* | 12/2011 | Mariblanca Nieves | 370/235 |
| 2012/0099715 A1* | 4/2012 | Ravishankar et al. | 379/114.01 |
| 2012/0129509 A1* | 5/2012 | Chan et al. | 455/418 |
| 2012/0185586 A1* | 7/2012 | Olshansky | H04L 41/0893 709/224 |
| 2012/0272237 A1* | 10/2012 | Baron | 718/1 |
| 2012/0276867 A1* | 11/2012 | Mcnamee | H04L 12/1407 455/406 |
| 2012/0297061 A1* | 11/2012 | Pedigo | H04L 43/12 709/224 |
| 2013/0005322 A1* | 1/2013 | Raleigh | G06Q 10/06375 455/418 |
| 2013/0149994 A1* | 6/2013 | Gaddam | H04L 41/069 455/406 |
| 2013/0176908 A1* | 7/2013 | Baniel | H04L 12/1407 370/259 |
| 2013/0258849 A1* | 10/2013 | Sharma et al. | 370/235 |

OTHER PUBLICATIONS

International Search Report and Written Opinion dated Dec. 20, 2013.

* cited by examiner

METHOD AND APPARATUS OF GROUP CREDIT CONTROL FOR WIRELESS NETWORKS

FIELD OF THE INVENTION

The invention relates to methods for charging fees to subscribers for services involving uploading and downloading data in wireless networks.

ART BACKGROUND

The Diameter Credit-Control Application (DCCA) is a well-known protocol that supports real-time charging for time units, volume units of uploaded or downloaded data, or the like, that are purchased by network subscribers through their use of network-provided services. Communications subject to the protocol are typically conducted between a gateway or control point as client, and an online charging system as server. The Diameter Credit-Control Application has been standardized in the IETF specification designated RFC 4006. The Diameter base protocol has been standardized in the IETF specification designated RFC 3588.

At the start of a subscriber session, and during the session, the client requests service units and the server grants service units by means of a message flow between the client and the server. In the CCR (Credit Control Request) message, the client requests a grant of some number of service units, and it may report on the number of units that have been used. The CCR message may also include a request to initiate or terminate the session.

In many communication networks, particularly LTE networks, the router that effectuates a wireless provider's connection to the Internet is referred to as the PDN Gateway (PGW). Accordingly, in FIG. 1 the client in this regard is PGW 10, and the server is Line Server 20. Below, we will use the term "RTR" interchangeably with "line server".

In the CCA (Credit Control Answer) message, the server responds with a grant of service units or with a rejection if, e.g., the account has been exhausted. The CCA may also include a statement of the remaining balance of credit units, and it may include a statement of the amount of time during which the current quota is valid. When the quota times out, the client renews the credit control request by sending a CCR-U (CCR Update) message, to which the server responds with a CCA-U (CCA Update) message.

Two further messages are Re-Authentication Request (RAR) and Re-Authentication Answer (RAA). The server, e.g. Line Server 20 of the figure, sends an RAR message to the client to request reauthentication or reauthorization of the client. The client, e.g. PGW 10 of the figure, responds by sending an RAA message to the server, followed by an authentication or authorization message.

It has recently become a widespread practice for networks to offer data download services and the like for pluralities of users or terminal devices that have been joined together in user groups. The accounting and charging for such services is often managed by a group server that is functionally part of the online charging system. Such a group server is illustrated as element 30 of FIG. 1, where it is shown as part of online charging system (OCS) 35.

Each individual user or terminal device that is being served is referred to here as one of the group of "lines" served by the group server. With further reference to FIG. 1, it will be understood that one line is constituted, in part, by Line Server 20 and PGW 10, and that other lines are likewise constituted by Line Servers 21, 22, and 23, with their respective PGWs 11, 12, and 13. Each such line is said to have a network end represented in the figure by the PGW and an OCS end represented in the figure by the line server.

Through messaging, the group server and line servers can regulate the usage of service units by the group, as well as by individual members of the group, in the downloading of data.

An illustrative exchange of such messages is illustrated in the signaling diagram of FIG. 2, in which elements having correspondences in FIG. 1 are denoted by like reference numerals. In the figure, it will be seen that after a new line served by PGW 10 has been added to the group, PGW 10 sends an initial CCR, i.e., CCR-I 41, to line server 20 to request a new session. The line server responds with the acknowledgement message CCA-I 42. In the CCA-I message, the line server assigns a quota of service units to the PGW. When the line has consumed its initial quota, or when the initial quota has timed out, PGW 10 sends an updated CCR message, i.e., CCR-U 61, reporting the consumed quota. The line server responds with acknowledgement message CCA-U 62, in which a new quota is assigned.

In response to a Session Parameter Update message (to be discussed below) from Group Server 30, the line server initiates the Session Reauthorization procedure by sending RAR message 81 to the PGW. The PGW acknowledges by sending RAA message 82 to the line server. RAR messages cause the PGWs that receive them to issue CCR-U messages reporting consumed quota and to request new quota allocations. Accordingly, in our illustration PGW 10 then sends a new CCR update message, i.e., CCR-U 91 to the line server. The line server responds with CCA-U message 92, in which a new quota is assigned.

One drawback of the protocol described above is that as the size of the user group grows, the amount of messaging required for managing the quotas can grow enough to significantly affect the profitability of the network. There is therefore a need for methods of quota management that use messaging more efficiently.

SUMMARY OF THE INVENTION

As used herein, a "usage block" is a range of reported usage over which the group quota is maintained at a constant level. According to methodologies in current use, RAR messages are sent on all lines of the group every time a new usage block is declared, and in the resulting reallocation of quota to the lines, all lines are treated equally. However, we have discovered that the total amount of messaging can be reduced, beneficially reducing processor load, if quota is reallocated to the lines in a selective manner. Accordingly, we have devised a new methodology in which the line servers selectively send RAR messages to the respective PGWs.

DETAILED DESCRIPTION

The total amount of download (or other communication processing) capacity allocated to the user group for a billing period or other regulatory period will be referred to as the group allowance. In the following discussion, we will characterize amounts of, e.g., download capacity in relative rather than absolute terms. Thus, the size of the full allowance is described below as "100%", and the sizes of portions thereof are described by correspondingly smaller percentage amounts. It will be understood that in practice, a group allowance will be quantifiable in absolute terms, e.g., as some number of megabytes.

It is desirable for both the network and the users to keep accurate track of the consumption of service units. For this purpose, it is common practice to report to users and/or to a billing system the total group usage when it reaches predefined usage milestones which may occur, e.g., when reported total group usage equals 50% of the total allowance, and further when the reported usage equals 75%, 90%, and 100%. We also refer to the usage milestones as "notification points", because they are convenient points at which the user is notified of how much of the paid-up allotment of, e.g., download capacity has been used up, and how much remains.

By conventional policy, the actual usage must not exceed the reported usage, i.e. the amount of service units that has been consumed as reported in CCR messages, by more than a predefined margin. We term this margin an "accuracy requirement." The accuracy requirement has a specified value at each milestone such as, for example, 5% at the 50% milestone. Similarly, the policy prohibits the actual usage from exceeding the reported usage by more than, e.g., 5% at the 75% milestone, 3% at the 90% milestone, and 1% at the 100% milestone.

However, new quotas that were granted in the last CCA messages will continue to be consumed during the interim between the consumption reports in the last CCR messages and the updated consumption reports in the next set of CCR messages. Hence, the actual usage at any given time may in fact exceed the reported usage by up to the amount of the last grant that was made to the group. In order to comply with the policy, it is therefore necessary to assure that the sum of the reported group usage and the currently granted group usage never exceeds the next milestone by more than its accuracy requirement, i.e., 5%, 5%, 3%, or 1% for the milestones at 50%, 75%, 90% and 100%, respectively in the instant example. The following discussion assumes the above-mentioned milestones and accuracy requirements.

Figure 3:
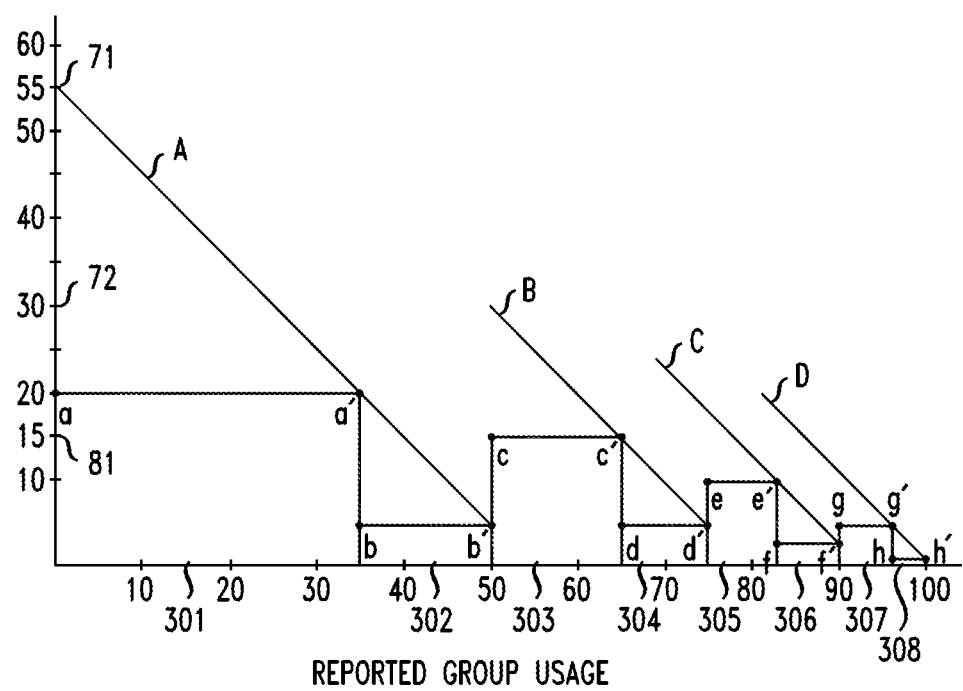
FIG. 3 is a graphical illustration of the principles underlying the assignment of usage blocks for regulating consumption of service units by the user group.

A better understanding of the principle stated above may be gained by making reference to FIG. 3. The horizontal axis (x-axis) of the figure represents the amount of usage known to the group server, i.e., the total amount of group consumption that has already been reported. (The reporting mechanism will be described below.) Four line segments, which we refer to as accuracy limits, are plotted in the figure.

Accuracy limit A is the graph of y=55%−x as plotted over the range from 0% to the first milestone. Likewise, accuracy limits B, C, and D are respectively the graph of y=80%−x as plotted over the range from the first to the second milestone, the graph of y=93%−x as plotted over the range from the second to the third milestone, and the graph of y=101%−x as plotted from the third to the fourth milestone.

For any value of the known usage, an operating point for the group can be defined as the point on the figure whose x-coordinate is the known usage, and whose y-coordinate is the amount of the outstanding quota, i.e., of the quota that was last made and that is still in progress. The group usage is in compliance with the policy if the operating point lies on or below the corresponding accuracy limit. However, the group usage is out of compliance if the operating point lies above the accuracy limit.

The policy is enforced by regulating the sizes of the quotas that are granted to the group. That is, each CCA message grants a relatively small amount of capacity to each line. When that quota is consumed, it may be renewed, via a CCA-U message, with a further, relatively small quota. If the quotas are made small enough, especially when approaching a milestone, policy violation can be prevented.

FIG. 3 provides an example in which an initial quota of 20% is granted to the group. It should be noted in this regard that the group-wide quota will be apportioned among the individual lines. Under current methodologies, an equal apportionment is made so that, for example, a 20% quota to a group of five lines will result in a local quota of 4% to each respective line.

It will be seen in the figure that the initial quota remains in force until the total reported usage reaches 35%. The 20% quota to the group cannot be sustained beyond this point without crossing the accuracy limit. Accordingly, the group operating point follows the horizontal line a-a', but then drops down to point b when the reported usage reaches 38.4%. As noted above, we use the term usage block to refer to a range over which the size of the group quota is constant. Accordingly, line a-a' defines usage block 301 as shown in the figure.

It will be understood that in the present example, usage is reported by individual lines in 4% units, and that 35% is not an integer multiple of 4% units. However, smaller units may be reported in the event, e.g., that a session terminates or a validity timer expires, causing the PGW to send a CCR-U message. Hence, the next usage block would typically be declared when the reported usage reaches or first exceeds 35%.

Returning to the example, it will be seen that similarly, the horizontal line b-b' defines usage block 302 at a group quota of 5% (boundary at 50%), the horizontal line c-c' defines usage block 303 at a group quota of 15% (boundary at 65%), the horizontal line d-d' defines usage block 304 at a group quota of 5% (boundary at 75%), the horizontal line e-e' defines usage block 305 at a group quota of 10% (boundary at 83%), the horizontal line f-f' defines usage block 306 at a group quota of 3% (boundary at 90%), the horizontal line g-g' defines usage block 307 at a group quota of 5% (boundary at 96%), and the horizontal line h-h' defines usage block 308 at a group quota of 1% (boundary at 100%).

It will be seen in FIG. 3 that points b', d', f', and h', respectively situated at the 50%, 75%, 90%, and 100% milestones, mark the endpoints of respective usage blocks 302, 304, 306, and 308. These milestones advantageously serve as key usage notification points at which the subscriber is notified of the extent to which the allowance in the subscriber's account has been exhausted. To achieve a desirable tradeoff between accuracy and signaling overhead, it is advantageous to define the usage block structure so as to provide a small integral number of usage blocks per interval between successive milestones. Accordingly, the usage block structure of FIG. 3 provides two usage blocks per milestone interval.

The reallocation of the group quota and of the local quotas is initiated by messaging between the group server and the line servers, and it is implemented through messaging between each line server and its respective PGW. The messaging is conveniently described with reference to the example of FIG. 2, to which the reader's attention is directed.

In the figure, it will be seen that message 51 is a Usage Update message that the line server sends to the group server. This message reports the line's current consumption level and the local quota last assigned to the line. The line server sends such a Usage Update message each time it receives a CCR message from its PGW. The group server acknowledges Usage Update message 51 by sending Usage Update Ack message 52 back to the line server. Similar message pairs consisting of a Usage Update and the corresponding acknowledgement are messages 71-72 and 75-76.

When the group server receives a Usage Update, it adds the reported consumption by the line to the known group consumption, and if necessary, it updates the outstanding group quota. The group server then compares the total reported group usage to the usage block boundary, and on that basis determines whether a new usage block needs to be declared. The new usage block is declared in a Session Parameter Update message that the group server sends to all line servers in its group.

The Session Parameter Update message includes a set of session parameters that control subsequent actions by the line servers. In particular, the group server uses session parameters to inform all of the lines of the size of the group quota associated with the new usage block.

Figure 1:
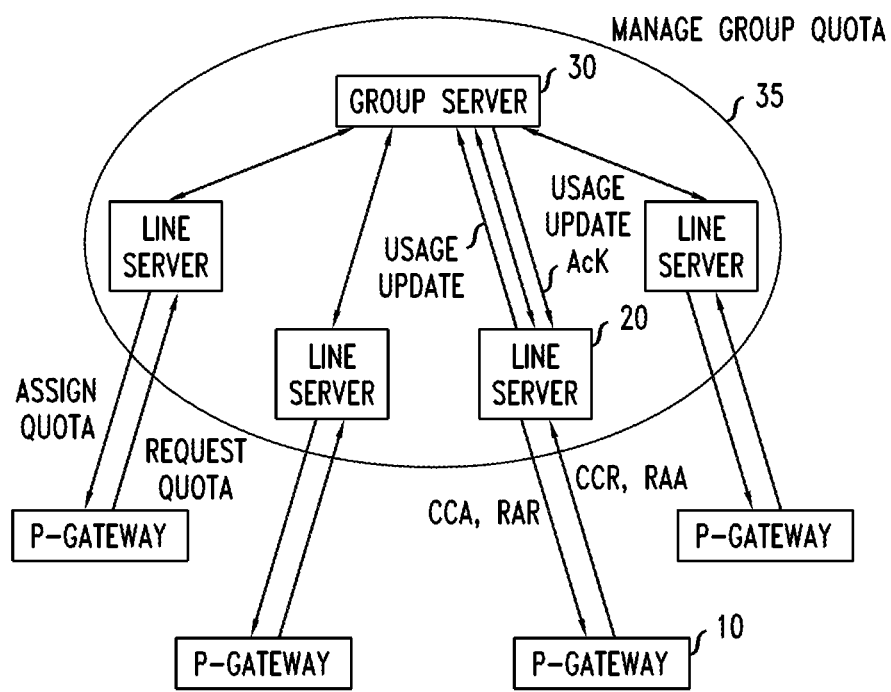
FIG. 1 is a high-level schematic depiction of a portion of a network in which an online charging system is serving a group of users.
Figure 2:
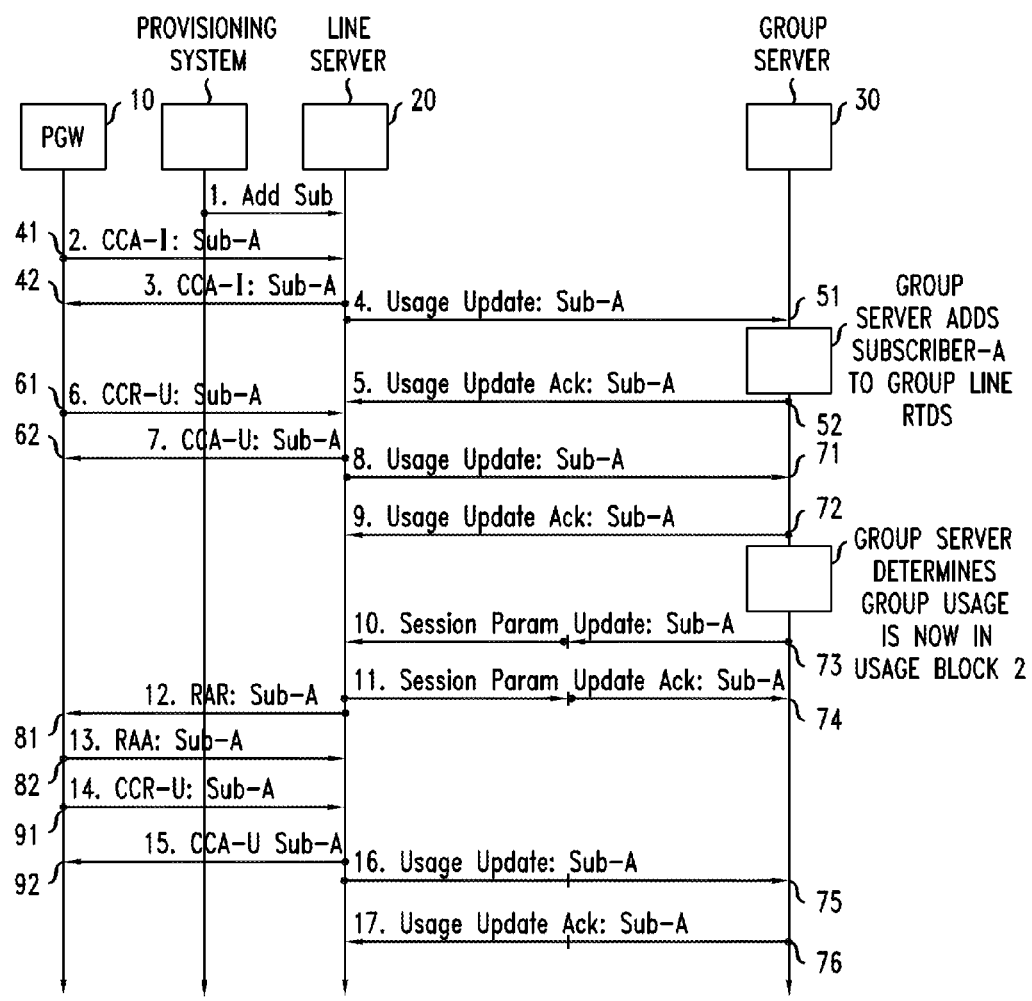
FIG. 2 is a signaling diagram illustrating a protocol for group credit control.

With further reference to FIG. 2, it will be seen that message 73 is an example of a Session Parameter Update message, and message 74 is the acknowledgement message "Session Parameter Update Ack" returned by the line server.

We previously indicated that at certain times, the line server sends an RAR message, such as message 81 of FIG. 2, to the PGW (as client) to request reauthentication or reauthorization of the client, and that the PGW responds by sending an RAA message and then a CCR-U message to the line server. We now point out that it is typical, in conventional implementations, to send the RAR message whenever the group server indicates, in the Session Parameter Update message, that a new usage block within a given milestone has been declared. (It is not always necessary to send an RAR message when entering the first usage block for a new milestone, because in that event, the allowed quota will typically increase rather than decrease.)

When the line server receives a CCR-U message such as message 91 that is responding to an RAR message, the line server returns a CCA-U message announcing to the PGW the size of a new line quota based on the group quota associated with the new usage block. An example of such a CCA-U message is message 92 of the figure.

In the example of FIG. 2, after sending CCA-U message 92, the line server sends Usage Update message 75 to the group server. In message 75, the line server informs the group server of the current consumption by the line, and of the size of the new quota allocated to the line. It will be understood that the group server computes the total consumption by the group, and it computes the size of the outstanding quota to the group, by adding the individual line values received from the respective line servers in the Usage Update messages.

According to methodologies in current use, RAR messages are sent on all lines of the group every time a new usage block is declared, and in the resulting reallocation of quota to the lines, all lines are treated equally. However, we have discovered that the total amount of messaging can be reduced, and network performance can thereby be improved, if quota is reallocated to the lines in a selective manner. Accordingly, we have devised a new methodology in which the line servers send RAR messages discriminately to the respective PGWs. By "discriminately", we mean that at a given usage block boundary, or even between usage block boundaries, the RAR messages may be sent to selected PGWs, or that different individual quotas may be allocated to different lines via the RAR messages. By "selected PGWs", we mean one or several, but not all, of the PGWs in the group.

In one example of our new methodology, the usage data provided by the PGWs in CCR-U messages and forwarded to the group server in Usage Update messages are used to identify lines that are relatively inactive. Relatively small quotas are granted to those lines, which we refer to as dormant lines, while larger quotas may be granted to the active lines. In specific implementations, the quota granted to a line declared, within a given milestone interval, to be dormant is the lowest quota over all usage blocks within that milestone interval.

If the granted quotas are small enough, it may be possible to operate within the accuracy bounds while obviating the RAR messaging to the dormant lines at the usage block boundaries. It should be noted that this approach differs from the conventional approach of allocating the same quota to every line in the group. We refer to this new approach as dormancy detection.

In another example of our new methodology, RAR messages are sent at the usage block boundary only on selected lines, i.e., on a subgroup of lines that may be less than the entire group. As explained above, the selected lines are allocated new quotas in accordance with the new usage block, via the exchange of messages in response to the RAR messages. The remaining lines continue to operate with their old quotas until those quotas are consumed or timed out, and therefore terminate. When the old quotas terminate, they are renewed, at the levels prescribed for the new usage block, through the "natural" exchange of CCR and CCA messages; i.e. through CCR and CCA messages that are not provoked by an RAR message from the line server to the PGW. We refer to this new approach as selective RAR messaging.

Dormancy detection and selective RAR messaging will be described in greater detail below.

Selective RARs

Figure 4:
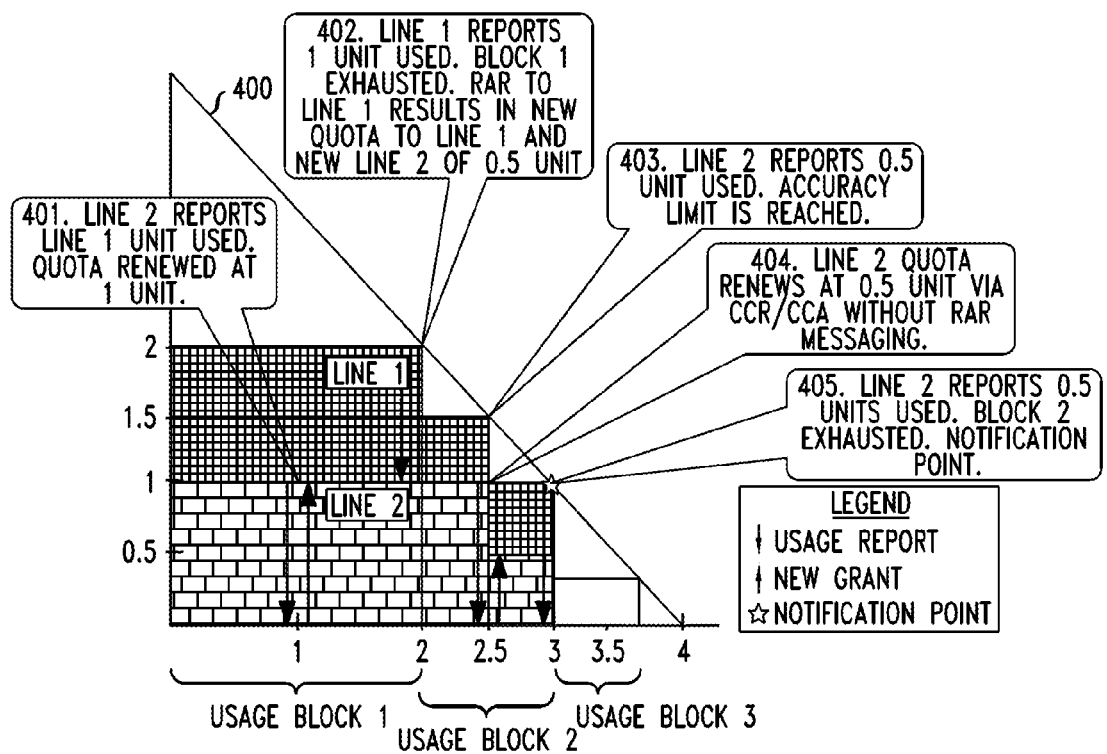
FIG. 4 is a graphical representation of two usage blocks, with a third usage block in partial detail, for a simplified group comprising only two lines.

Further insight into the dynamics of group usage, in the context of the present invention, may be gained by reference to FIG. 4, in which for ease of exposition the number of lines in the group has been limited to two. FIG. 4 is a graph similar to FIG. 3, in which total usage reported for the group is plotted on the horizontal axis, and the amount of outstanding quota is represented by distance along the vertical axis. An accuracy limit 400, similar to line A of FIG. 3, is shown in the figure. Two usage blocks, identified as Usage Block 1 and Usage Block 2, are represented. In the first block, Line 1 and Line 2 have equal quotas of 1 unit each. In the second block, Line 1 and Line 2 have equal quotas of 0.5 units each. The y-coordinate of the operating point for the group is the total of the outstanding quota for Line 1 and the outstanding quota for Line 2. This total may change when one or more lines engage in an RAR/RAA handshake, resulting in allocation of one or more new line quotas.

In reading a graph such as FIG. 4, it is important to bear in mind that what is represented by points along the horizontal axis is not elapsed time, but rather amount of total group usage that has been reported to the group server. Progress along the horizontal axis is made in increments of a currently active quota. That is, the operating point moves to the right by the reported amount each time a line reports that its current quota has been exhausted, or reports the amount consumed (even if less than the full quota allocated) in response to an RAR message. It will be understood that a few lines, or even one very active line, may account for all of the service units reported as consumed within a given usage block. As will be discussed in more detail below in reference to an embodiment we term "dormancy detection", a line that has a relatively low amount of activity may be declared "inactive" and subjected to special treatment.

In the figure, each usage report by an individual line is represented by a down arrow, and each new quota that is granted to an individual line is represented by an up arrow. (We do not use any symbol to represent a null usage report.) The positioning of the down and up arrows relative to the horizontal axis is not to scale, and is chosen purely for convenience.

With further reference to FIG. 4, it will be seen that usage block boundaries occur in this example at reported usage levels of 2 and 3. The positions of the usage block boundaries are typically prearranged, and the quotas for each usage block are typically chosen such that when the group server determines that reported usage has reached the usage block boundary, it will determine that new quotas must be allocated. In such an event, the group server issues a Session Parameter Update message, as described above.

The procedure by which line quotas are negotiated will now be described in greater detail with further reference to FIG. 4. Initially, both lines are allocated quotas of 1 unit, as explained above. At event 401, Line 2 reports 1 unit consumed and renews its quota of 1 unit via a CCR/CCA handshake. At event 402, Line 1 reports 1 unit consumed via a CCR/CCA handshake.

The group server now recognizes that the group has reported a total of two service units, and thus that the boundary of Usage Block 1 has been reached. To avoid violating the accuracy limit, new quotas must now be declared. Conventionally, RAR messages would be sent to both lines, resulting in each line receiving a new quota which in this example is 0.5 units. In our new selective RAR technique, however, it is sufficient to reduce, at a given time, the quotas of some, but not all, lines if that will avoid violating the accuracy limit.

Accordingly, at event 402 in our example, Line 1 is allocated a new quota of 0.5 units via an RAR/RAA handshake followed by a new CCR/CCA handshake. An RAR is not, however, sent to Line 2.

In the typical quota negotiation with Line 1 that would take place at event 402, Line 1 requests and is granted a renewed quota of one service unit. The line server informs the group server via a Usage Update message. The group server recognizes that the block boundary has been reached and issues a Session Parameter Update message which allocates a new quota to Line 1 of 0.5 unit and a new quota to Line 2 of 0.5 unit. The line server on Line 1 responds to this by entering into an RAR/RAA exchange with the PGW for Line 1. In the RAR message, the line server retracts the new grant of one service unit. Because the RAR message causes the line to make a new quota request, Line 1 then requests a new quota, and is granted a quota of 0.5 service units via CCR/CCA messaging.

The system then proceeds to event 403, where, via a CCR/CCA handshake, Line 2 reports 0.5 units used.

At event 403, the total reported usage for the group is 2.5 units. The total outstanding group quota just before event 403 is 1.5 units. The group server now recognizes that at least one line quota must be reduced to avoid violating the accuracy limit (We note that this example has been simplified to ease exposition. More typically, the quota reallocation is triggered when the operating point actually violates the accuracy limit, not when it simply reaches the accuracy limit.)

As explained earlier, the conventional approach is to declare a new usage block when the total reported usage reaches a limit. That is, the decision to declare a new usage block is based solely on the amount of reported usage. In the new approach described here, by contrast, the quota reallocation is triggered by a full consideration of the operating point; that is, by comparing the sum of reported usage plus outstanding quota to the accuracy limit.

Thus, an RAR message would be sent to at least one line at event 403 if necessary to reduce a line quota. However, an RAR is not necessary in this particular instance. Instead, at event 404, the quota for Line 2 is renewed at only 0.5 unit instead of 1 unit via ordinary CCR/CCA messaging in accordance with the last Session Parameter Update message. No RAR is needed.

In implementations, the group server makes the selection of which line shall receive the selective RARs. The selection may be based, e.g., on which lines have the largest outstanding quotas. For this purpose, the Session Parameter Update message may include the current usage block and a flag set selectively per line, telling the line server whether or not to send an RAR.

In response to the RAR at event 404, Line 2 reports the amount of quota it has used since its last allocation, which in our example is zero, and thus the total reported group usage remains at 2.5 units. The RAR also causes Line 2 to initiate a new CCR/CCA handshake, as a consequence of which Line 2 receives a new quota of 0.5 units.

The negotiation of a new quota for Line 2 at event 404 is an example of a forced termination of the previous quota, which is initiated to avoid violating the accuracy limit. It should be noted in this regard that there will also be instances of natural termination, in which a line quota allocated in one usage block persists into a subsequent usage block until it times out or is exhausted, but before the next usage block boundary is reached. In such a case, the affected line will initiate a CCR/CCA handshake which results in allocation of the new quota, without an exchange of RAR/RAA messages.

The system then proceeds to event 405, where Line 2 reports that it has used up its current allocation of 0.5 units. The group server recognizes that the total group usage has reached 3 units, which marks the boundary of Usage Block 2. The group server issues a new Session Parameter Update message, at least one line server issues an RAR, and the group proceeds into Usage Block 3.

At event 405, as indicated in the figure, the group also reaches a notification point.

There are several alternative approaches for selecting which lines shall receive RAR messages at a usage block boundary. In one possible approach, the group server randomly selects the line or lines among those having largest current quotas. In another possible approach, the group server may select the line whose quota was allocated farthest in the past from among the lines with the maximum allocated quota.

For Selective RARs, the method for selecting which lines shall receive RAR messages to avoid an accuracy violation while a usage block is in progress is similar to the method used at the usage block boundary. However, if the usage block is in progress, the group server broadcasts an alarm to all of the line servers via a Session Parameter Update message. Selected line servers respond by sending RAR messages to their respective PGWs. Thus, for example, the selected line servers might be those having a current quota at or above a prearranged threshold (which may depend on the block number), or those that are still operating with quotas that were allocated in previous usage blocks and exceed the quotas in the current usage block.

The preceding examples are illustrative and not intended to be limiting as to the variety of selection techniques that may be available. Thus, for example, one alternative approach is directed at selecting those lines that have high allocated quota and are farthest from sending the next CCR-U message. According to such an approach, the consumption rates are tracked for all active lines and compared with the time quotas that were granted. That information then serves as a basis for estimating how long it will be before each line needs to send a CCR-U message.

Dormancy Detection

Figure 5:
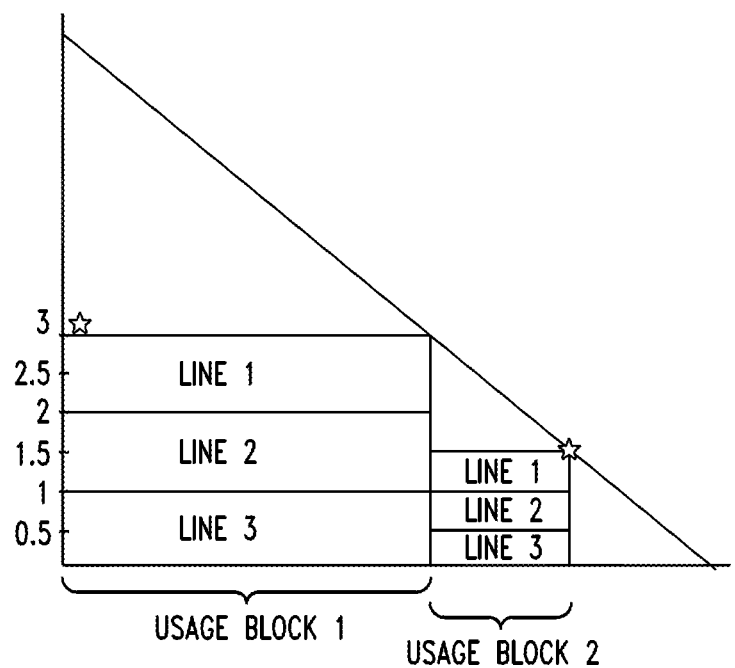
FIG. 5 is a graphical representation of two usage blocks, with individual line quotas indicated, for a simplified group comprising three lines.

A fuller understanding of dormancy detection is facilitated by reference to FIG. 5, where two usage blocks again denominated Usage Block 1 and Usage Block 2 are shown. The group represented in FIG. 5 consists of three lines, respectively denominated Line 1, Line 2, and Line 3. The group quota for Usage Block 1 is 3 service units, of which one unit is allocated to each of the respective lines. The group quota for Usage Block 2 is 1.5 service units, of which 0.5 units are allocated to each of the respective lines. A reporting milestone occurs at the beginning of Usage Block 1 and at the end of Usage Block 2. It will thus be understood that two line quotas are defined in the illustrated milestone interval, namely 1 unit (in Usage Block 1) and 0.5 units (in Usage Block 2). Accordingly, the smallest line quota defined in the milestone interval is 0.5 service units.

Simply stated, the objective of dormancy detection is to reduce CCR/CCA signaling by identifying relatively inactive lines, i.e., so-called dormant lines, and assigning them relatively small line quotas. In implementations, these processes are performed locally by the pertinent line servers, without instruction from the group server. In implementations, the line server will assign quotas to the dormant lines via ordinary CCR/CCA messaging.

The quota assigned to a dormant line will typically be the smallest line quota defined in a milestone interval, although other possibilities are not excluded. In the example of FIG. 5, for example, a dormant line would typically be assigned a quota of 0.5 service units. In some cases, it may even be advantageous to assign a quota that is the smallest among all milestone intervals for the given total group quota. The smallest quota is typically the quota in the last usage block with boundary at 100% usage.

If a line continues to be dormant, it may keep its assigned quota through the several usage blocks that fill a milestone interval, and may even persist with the same quota into subsequent usage blocks in one or more subsequent milestone intervals.

Although dormancy detection is advantageous even when implemented alone, it may be even more advantageous when combined with selective RAR messaging. For example, we have explained above that in selective RAR messaging, it is sometimes necessary to use an RAR message to force a quota reallocation while a usage block is in progress to avoid an accuracy violation. However, if some lines have been declared dormant and consequently have been allocated small quotas, this will likely enable the group to penetrate farther into a new usage block before facing a potential accuracy violation that necessitates a forced RAR/RAA handshake.

One possible test for dormancy (as well as for a return to non-dormant activity) can be performed by averaging the line's consumption rate, as obtained from usage reports over a period of time, and comparing the resulting average activity level with a threshold. Thus, for example, each of many raw consumption rates is computed from the usage reported in a CCR message together with the time over which the reported quota was consumed. The raw consumption rates are averaged using e.g. an exponential averaging formula over a period of time that advantageously spans at least several CCR/CCA handshakes. The averaging period is advantageously configurable, and would typically take a value such as 48 hours.

To avoid rapid oscillation between dormant declarations and active declarations, it will in at least some cases be advantageous to require the test for dormancy to be satisfied for several CCR messages in succession before dormancy is declared.

For detecting a line's return to active status, it will generally be preferable to take one successful threshold test, rather than a series of such tests, as sufficient. Although it will often be sufficient to use the same threshold for both dormant declarations and active declarations, the possibility of using different thresholds is not excluded. Moreover, different thresholds may be defined for separating the lines into three, or even more, classes depending on their respective levels of activity. Each level below the highest level of activity may be assigned a respective, reduced quota.

It is a well-known characteristic of exponentially averaged functions that they are relatively insensitive to rapid fluctuations in the underlying function that is being averaged. In the present context, this implies that the threshold test described above for detecting a line's return to activity might not respond quickly enough to a sudden jump in consumption rate when, for example, a previously inactive user requests a large data download late at night. To assure a rapid response to demands of this type, a return to active status can also be triggered by a further threshold test based on the raw consumption rate calculated from the most recent CCR message.

One possible dormancy threshold will now be described for purposes of illustration, without limitation. Let G/L be the total volume of data allocated to the group per month according to the contracted customer agreement, divided by the number of lines that have been activated. (The number L of activated lines may change from time to time, but updated values of this number can be broadcast by the group server in update messages to the line servers.) Estimating that there are, on average, about 20 busy days per month, the average session data rate will be $0.05 \times (G/L)$ per day. An exemplary dormancy threshold (per line) is ten percent of the average session data rate, i.e., $0.005 \times (G/L)$ per day. If, for example, G/L equals one gigabyte, then the dormancy threshold will be 5 megabytes per day.

In implementations, the dormancy and activity declarations will be made by the line server using information made available to it through CCR messaging, without participation by the group server. The group server will have its normal function of recording the quota which has been allocated, irrespective of whether it is the normal quota for active lines, or the reduced quota for dormant lines.

Selective RARs

Comparative Example

Figure 6:
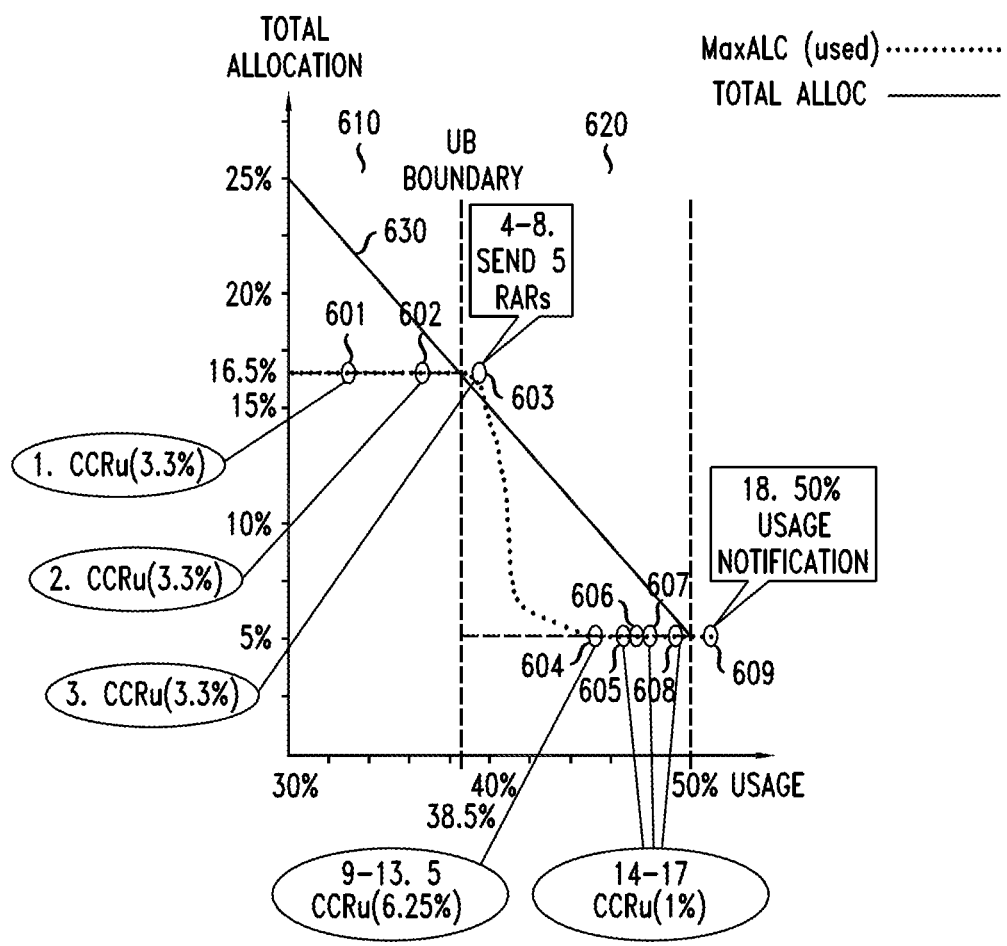
FIG. 6 is a graphical illustration of the trajectory of the charging system operating point of a group of users using a conventional approach to messaging.

FIG. 6 provides an example in which RARs are sent in the conventional manner. The figure represents two usage blocks 610, 620, the first of which extends from reported usage of 0 to 38.5%, and the second of which extends from 38.5% to 50%, at which there is a notification point. (For ease of presentation, the range of reported usage shown in the figure is 30%-55%.) The trajectory shown in the figure represents the evolution of the group operating point. The total number of lines in the group is five.

Within block 610, one line sends a CCRu message at event 601, and one line sends a similar message at event 602. The line quota for block 610 is 3.3%, hence the group quota is 16.5% (assuming 5 lines are in the group).

Within block 620, one line sends a CCRu message at event 603. As the usage block boundary has just been crossed, each of the five line servers also sends an RAR message to its respective PGW at event 603. Each of the five RAR message causes its respective line (i.e., the receiving PGW) to issue a CCRu message reporting on the line usage and requesting a new quota. The line quota for block 620 is 1%, hence the group quota is 5%.

Event 604 represents the group operating point just after the last of the five CCRu messages. Each of the incremental displacements that collectively form the trajectory between events 603 and 604 consists of a horizontal advancement representing the amount of usage reported by a respective line, composed with a vertical drop representing a decrease in the total outstanding group quota by 2.3%, i.e., by the difference between the previous line quota of 3.3% and the new line quota of 1%.

As noted, each RAR message forces the affected line to report in a CCR message the total of its usage since its last usage report. In the example provided by FIG. 6, the five CCRu messages sent between events 603 and 604 collectively report a total usage of 6.25%. If, e.g., the cumulative usage reported by the group at event 603 is 39.6%, then the next five CCRu messages will bring the cumulative reported usage for the group up to 45.85%.

At each of events 605, 606, 607, and 608, a line reports via CCR messaging a further usage increment of 1%, bringing the total reported usage at event 608 up to 49.85%. The next renewal of a line quota at the 1% level will violate accuracy limit 630, which will make it necessary to declare a new usage block. Indeed, the next CCRu, reporting at event 609 another usage increment of 1%, brings the reported total usage to 50.85%, which exceeds the notification milestone and therefore triggers a usage notification to the user. A new accuracy limit may also be imposed at the milestone.

Figure 7:
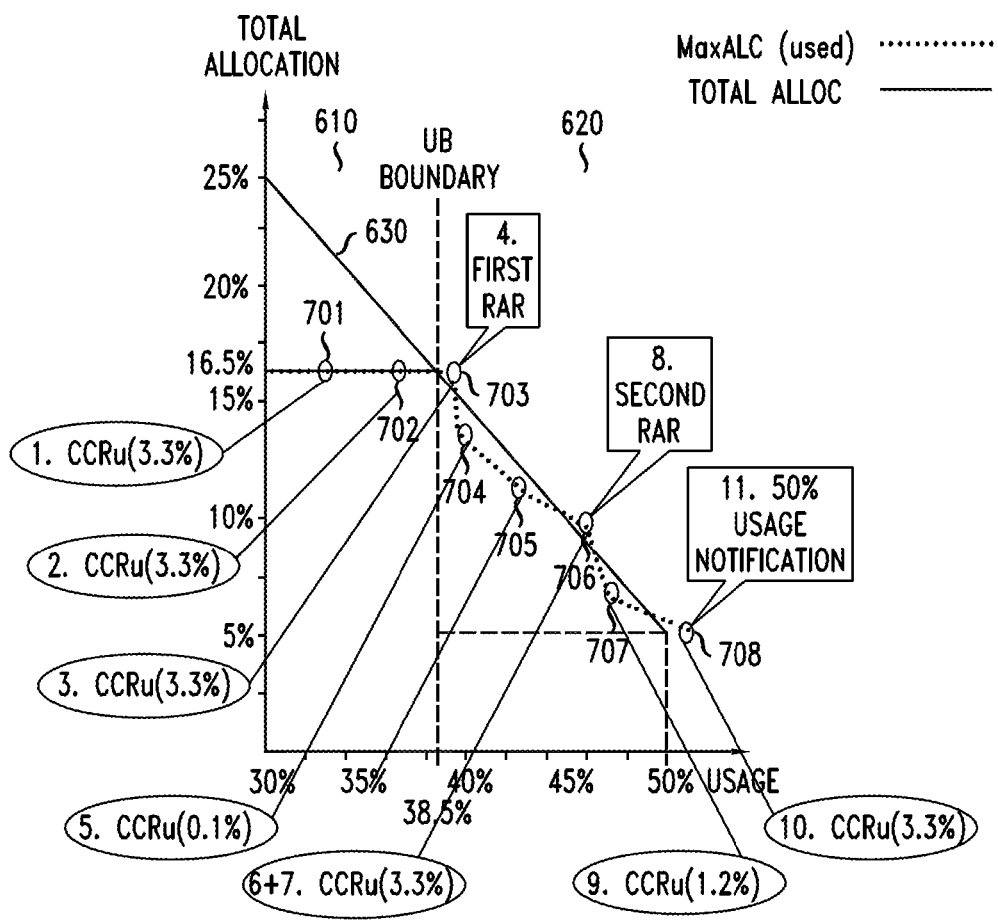
FIG. 7 is a graphical illustration of the trajectory of the charging system operating point of a group of users using Selective RAR messaging as described herein.

FIG. 7 represents the same system as FIG. 6, except that RAR messages are now sent selectively. Corresponding features of the two figures are identified by like reference numerals.

Events 701 and 702 proceed like events 601 and 602 of the preceding figure.

Within block 620, one line sends a CCRu message at event 703. As the usage block boundary has just been crossed, at least one line must have its quota reduced. Accordingly, an RAR message is sent to one line, which responds by CCRu at event 704 with a report of, e.g., 0.1% usage. This brings the total reported usage to 39.7%. The affected line drops down to a quota of 1%, bringing the total outstanding group quota down to 14.2%.

It should be noted that all lines receive the new usage block information via a Session Parameter Update message from the group server to the line servers. As a consequence, lines that have not been sent an RAR message can still renew their quotas at the reallocated levels via the ordinary exchange of CCR messages.

At event 705, another line reports, by CCRu, a usage of 3.3%. This brings the total reported usage up to 43%. Because the boundary of the first usage block has been crossed, the affected line naturally drops down to a quota of 1%, bringing the total outstanding group quota down to 11.9%.

At event 706, another line reports, by CCRu, a usage of 3.3%. This brings the total reported usage up to 46.3%. The affected line naturally drops down to a quota of 1%, bringing the total outstanding group quota down to 9.6%. However, the group server recognized that there is an accuracy violation at event 706 and in response, it causes a second RAR message to be sent to one line. The affected line responds with a CCRu message at event 707 reporting a usage of 1.2%, and drops down to a quota of 1%. This brings the total reported usage up to 47.5% and brings the total outstanding group quota down to 7.3%.

At event 708, one line reports, by CCRu, a usage of 3.3%. This brings the total reported usage up to 50.8%, which exceeds the notification milestone and therefore triggers a usage notification to the user.

A comparison of FIGS. 6 and 7 will show that the beginning and ending states are similar, but whereas five RAR messages were sent in the example of FIG. 6, only two RAR messages were sent in the example of FIG. 7.

The functions of the various elements shown in the figures, including any functional blocks labeled as "processors," "severs," "routers," or the like, may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein the instructions perform some or all of the steps of the above-described methods. The program storage devices may be, e.g., digital memories, magnetic storage media such as a magnetic disks and magnetic tapes, hard drives, or optically readable digital data storage media. The embodiments are also intended to cover computers programmed to perform the steps of the above-described methods.

It should further be understood that the term "module" as used herein may refer to a specialized circuit or combination of circuits, or it may refer to a set of instructions recorded in a machine-readable memory, together with general-purpose or special-purpose circuitry capable of carrying out the recorded instructions.

What is claimed is:

1. A method for metering usage, on a group of lines subject to a group user agreement, of data processing capacity of a network, the method comprising:
   receiving usage reports from respective lines of the group of lines;
   maintaining a usage total, over the group of lines, of usage that has been reported by the respective lines of the group of lines;

maintaining an outstanding total, over the group of lines, of outstanding usage quotas that have been granted to the respective lines of the group of lines, the outstanding usage quota of a respective line being one or more data quotas granted to the respective line of the group of lines but not reported as being used by the respective line;

detecting at least one violation event based on a comparison between the usage total and a limit, the limit being based on one of two or more data usage milestones and an accuracy threshold, the accuracy threshold indicating an allowed discrepancy between an actual usage by the group of lines and the usage total, the at least one violation event indicating that the outstanding total violates the limit;

upon detecting the at least one violation event, automatically selecting one or more lines of the group of lines for quota reallocation; and automatically transmitting an instruction to one or more processors serving the one or more lines selected, but to no processor serving any other line of the group of lines, that causes a new quota to be negotiated for the one or more lines selected.

2. The method of claim 1, wherein the at least one violation event occurs at one of the two or more data usage milestones, the automatically selecting selects the one or more lines of the group of lines when the usage total is between two of the two or more data usage milestones, and the automatically transmitting transmits the instruction to the one or more processors when the usage total is between the two of the two or more data usage milestones.

3. The method of claim 2, further comprising:

sending session parameter information to processors serving all lines of the group of lines at least at one of the two or more data usage milestones, wherein the session parameter information includes updated values of usage quotas for the respective lines of the group of lines.

4. The method of claim 1, wherein the metering is performed in accordance with the DIAMETER authentication, authorization, and accounting protocol, and at least one of the usage reports received from the respective lines of the group of lines is derived from CCR messages, as specified in the DIAMETER protocol.

5. The method of claim 4, wherein the instruction is a message that includes parameters which, when read by the one or more processors serving the one or more lines selected, cause the one or more lines selected to issue RAR messages as specified in the DIAMETER protocol.

6. A method for metering usage, on a group of lines subject to a group user agreement, of data processing capacity of a network, the method comprising:

receiving usage reports from respective lines of the group of lines;

maintaining a usage total, over the group of lines, of usage that has been reported by the respective lines of the group of lines;

maintaining an outstanding total, over the group of lines, of outstanding usage quotas that have been granted to the respective lines of the group of lines, the outstanding usage quota of a respective line being one or more data quotas granted to the respective line of the group of lines but not reported as being used by the respective line;

detecting at least one violation event based on a comparison between the usage total and a limit, the limit being based on one of two or more data usage milestones and an accuracy threshold, the accuracy threshold indicating an allowed discrepancy between an actual usage by the group of lines and the usage total, the at least one violation event indicating that the outstanding total violates the limit;

evaluating a consumption rate of at least one of the respective lines of the groups of lines from the usage reports and time measurements;

classifying the at least one of the respective lines of the group of lines as dormant when the corresponding consumption rate drops below a first threshold;

upon detecting the at least one violation event, automatically transmitting an instruction to a processor serving the at least one of the respective lines of the group of lines classified as dormant, the instruction causing a special quota to be allocated to the at least one of the respective lines of the group of lines classified as dormant, the special quota being smaller than a previously allocated quota to the at least one of the respective lines of the group of lines.

7. The method of claim 6, wherein the special quota is a smallest line quota defined on a specified range of total group usage values.

8. The method of claim 6, wherein the special quota is allocated via an exchange of CCR and CCA messages according to the DIAMETER authentication, authorization, and accounting protocol.

9. The method of claim 6, further comprising:

upon the at least one line of the group of lines being classified as dormant, reclassifying the at least one line of the group of lines as an active line when the consumption rate rises above a second threshold.

10. The method of claim 9, wherein the consumption rate based on which the at least one line of the group of lines is classified as dormant is averaged over a longer period of time compared to the consumption rate based on which the at least one line of the group of lines is reclassified as the active line.

11. The method of claim 9, wherein the first threshold is different from the second threshold.

12. An apparatus for metering usage, on a group of lines subject to a group user agreement, of data processing capacity of a network, the apparatus comprising a processor and an associated memory, wherein the processor is configured to, receive usage reports from respective lines of the group of lines;

maintain a usage total, over the group of lines, of usage that has been reported by the respective lines of the group of lines;

maintain an outstanding total, over the group of lines, of outstanding usage quotas that have been granted to the respective lines of the group of lines, the outstanding usage quota of a respective line being one or more data quotas granted to the respective line of the group of lines but not reported as being used by the respective line;

detect at least one violation event based on a comparison between the usage total and a limit, the limit being based on one of two or more data usage milestones and an accuracy threshold, the accuracy threshold indicating an allowed discrepancy between an actual usage by the group of lines and the usage total, the at least one violation event indicating that the outstanding total violates the limit;

upon the processor detecting the at least one violation event, automatically select one or more lines of the group of lines for quota reallocation; and automatically transmit an instruction to one or more processors serving the one or more lines selected, but to no processor serving any other line of the group of lines, that causes a new quota to be negotiated for the one or more lines selected.

13. An apparatus configured to meter usage, on a group of lines subject to a group user agreement, of data processing capacity of a network, the apparatus comprising a processor and an associated memory, wherein the processor is configured to, receive usage reports from respective lines of the group of lines;

maintain a usage total, over the group of lines, of usage that has been reported by the respective lines of the group of lines;

maintain an outstanding total, over the group of lines, of outstanding usage quotas that have been granted to the respective lines of the group of lines, the outstanding usage quota of a respective line being one or more data quotas granted to the respective line of the group of lines but not reported as being used by the respective line;

detect at least one violation event based on a comparison between the outstanding usage total and a limit, the limit being based on one of two or more data usage milestones and an accuracy threshold, the accuracy threshold indicating an allowed discrepancy between an actual usage by the group of lines and the usage total, the at least one violation event indicating that the outstanding total violates the limit;

evaluate a consumption rate of at least one of the respective lines of the group of lines from the usage reports and time measurements;

classify the at least one of the respective lines of the group of lines as dormant when the corresponding consumption rate drops below a first threshold; and upon detecting the at least one violation event, automatically transmit an instruction to a processor serving the at least one of the respective lines of the group of lines classified as dormant, the instruction causing a special quota to be allocated to the at least one of the respective lines of the group of lines classified as dormant, the special quota being smaller than a previously allocated quota to the at least one of the respective lines of the group of lines.

* * * * *